United States Patent
Sukkarié et al.

(10) Patent No.: US 9,014,888 B2
(45) Date of Patent: Apr. 21, 2015

(54) VEHICLE COMMUNICATION, ANALYSIS AND OPERATION SYSTEM

(75) Inventors: Anwar Mohamad Farid Sukkarié, Vancouver (CA); Clive Richard Wright, Vancouver (CA); Bruce William Adams, West Vancouver (CA)

(73) Assignee: Saturna Green Systems Inc., Vancouver (CA)

( * ) Notice: Subject to any disclaimer, the term of this patent is extended or adjusted under 35 U.S.C. 154(b) by 136 days.

(21) Appl. No.: 13/550,809

(22) Filed: Jul. 17, 2012

(65) Prior Publication Data

US 2013/0024060 A1    Jan. 24, 2013

Related U.S. Application Data

(60) Provisional application No. 61/510,436, filed on Jul. 21, 2011.

(51) Int. Cl.

| | | |
|---|---|---|
| *B60L 11/00* | (2006.01) | |
| *G01C 21/26* | (2006.01) | |
| *H04L 29/08* | (2006.01) | |

(52) U.S. Cl.
CPC ................ *G01C 21/26* (2013.01); *H04L 67/12* (2013.01)

(58) Field of Classification Search
CPC ............................... H04L 67/12; G01C 21/26
USPC .......................................................... 701/22
See application file for complete search history.

(56) References Cited

U.S. PATENT DOCUMENTS

| | | | |
|---|---|---|---|
| 5,378,555 | A | 1/1995 | Waters et al. |
| 5,523,666 | A | 6/1996 | Hoelzl et al. |
| 5,612,606 | A | 3/1997 | Guimarin et al. |
| 5,646,534 | A | 7/1997 | Kopera |
| 5,790,976 | A | 8/1998 | Boll et al. |
| 5,808,469 | A | 9/1998 | Kopera |
| 5,931,245 | A | 8/1999 | Uetake et al. |
| 6,487,477 | B1 | 11/2002 | Woestman et al. |
| 8,620,491 | B2 * | 12/2013 | Patel et al. ................ 701/2 |
| 2010/0106603 | A1 * | 4/2010 | Dey et al. ............. 705/14.63 |

FOREIGN PATENT DOCUMENTS

WO        2005035288        4/2005

* cited by examiner

*Primary Examiner* — Helal A Algahaim
*Assistant Examiner* — Nga X Nguyen
(74) *Attorney, Agent, or Firm* — John R. Flanagan

(57) ABSTRACT

A communication and analysis system can manage data operations with a vehicle centric system. A vehicle that is in a communications link with a network can also manage its activities based on real-time, historical and predictive knowledge, without having this knowledge processing on-board. Such data processing includes the geo-spatial, internal functions and operator specific requirements. The rule based system also incorporates the use patterns of a specific vehicle, or a specific user. A use pattern can be transferred from one operator to another or be shared to assist with navigation and operations. A vehicle operator or vehicle multiple operators can share or upload information that can assist with efficient operations, including fuel conservation and time management. Use patterns can be assigned to geospatial regions and be used for comparative analysis for such activities as efficient operation, safe travel and navigation.

20 Claims, 6 Drawing Sheets

VEHICLE COMMUNICATION, ANALYSIS AND OPERATION SYSTEM

FIELD OF THE INVENTION

The present invention pertains to the field of vehicle operations and in particular to control and decision management.

BACKGROUND

The operating mode of an electric vehicle is often characterized by its time until recharge and the options surrounding this. Existing methods of power management to optimize the electric-drive mode include rule based control algorithms, based on static variables, and pattern recognition which can include current driving patterns such as acceleration, regenerative-braking energy and stop time.

Dynamic programming algorithms have been used, based on the knowledge of real-time data to model a trip. Simulations have included intelligent traffic systems and global positioning systems technologies in analytical models. Real-time traffic data can be analyzed to optimized operations and have been used in geographic scaling to localize the inputs in order to attempt to reduce computational requirements. Vehicle power management systems can include real-time traffic data such as traffic flow, traffic light stop time, traffic congestion and so on in a predictive energy management system.

Efforts to improve performance have included the use of traffic data including traffic flow and intersection light status to determine if alternative routes should be considered; as well as, vehicle operation modes including vehicle speed, transmission gear and state of charge. Trip modeling has included road conditions such as slope and distance, incorporating global positioning systems and re-routing following the processing of traffic data.

Boll et al. (U.S. Pat. No. 5,790,976), Boss et al. (U.S. Pat. No. 8,014,914 B2), Woestman, et al. (U.S. Pat. No. 6,487,477), and Shunder (U.S. Pat. No. 8,185,302 B2) disclose such on-board energy management routing systems.

Boll et al. (U.S. Pat. No. 5,790,976) discloses an on-board route selecting device for vehicles with a prescribed capacity of energy storage that takes into account energy supply/refuelling/recharging locations along possible routes. Boss et al. (U.S. Pat. No. 8,014,914 B2) discloses methods of route planning based on the vehicle type of either an internal combustion engine or hybrid.

Woestman, et al. (U.S. Pat. No. 6,487,477) discloses the integration of an on-board navigation system with the energy management control system for an electric vehicle (EV) and a hybrid electric vehicle (HEV). The vehicle's real-time location is continuously monitored, expectations of driver demand are determined, and vehicle accommodations are made. The system can be configured to include as part of its present vehicle location data on road patterns, geography with date and time, altitude changes, speed limits, driving patterns of a vehicle driver, and weather. The vehicle accommodations can be configured to use discrete control laws, fuzzy logic, or neural networks.

Shunder (U.S. Pat. No. 8,185,302 B2) discloses a method of determining an optimal fuel usage route using a vehicle based computing system which uses data received through a GPS unit or a wireless telematic device either installed in the vehicle or portable device such as a cell phone. The system aggregates weighted values of possible routes taking into account road related data such as distance, braking, speed constancy, energy generation and projected fuel consumption. Based on adjusted or weighted values the system suggests an optimal route.

However, electric vehicle systems are multi variable dynamic systems and there are high computational loads associated with integrating real-time traffic data with the energy management systems of these vehicles. Additionally, operators are becoming increasingly more connected with informational networks, and their expectations are increasing for adaptive mobile vehicle systems that can intelligently manage and integrate the various vehicle operational patterns and systems, driver patterns and preferences, along with the massive amounts of real-time, historical and predictive geo spatial data being generated to provide an optimal driving experience. Use of such a system will result in higher electric vehicle performance thereby becoming more widely accepted in comparison to internal combustion engines.

The present art systems are limited to the processing of vehicle centric real-time information in combination with relative geospatial information. This cannot presently be efficiently managed, and this limits the ability of systems to provide predictive analytics. This is further restricted by the ability to manage vast numbers of distributed inputs on an ongoing basis. Therefore there is a need to provide improved mobile telematics and navigation and improved means for managing such information.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In accordance with the present invention, a vehicle communication, analysis and operation system includes hardware, firmware and software for managing vehicles by employing inputs from a vehicle and intelligent correlation with analysis techniques such that a rule based system can manage the data operations of a vehicle, and a vehicle communications link with a network can also be used to manage the vehicle's activities based on real-time, historical and predictive knowledge, without having all this knowledge processing on-board the vehicle.

Further in accordance with the present invention, driver and/or vehicle preferences act in the vehicle communication, analysis and operation system as inputs to a rule based system allowing optimization of real-time processing and where predictive aspects of what is happening on a driver's display can be displayed or shared on a network.

BRIEF DESCRIPTION OF THE DRAWINGS

The drawings illustrate aspects of the invention, and should not be construed as restricting the scope of the invention in any way.

DETAILED DESCRIPTION OF THE INVENTION

Definitions

Figure 1:
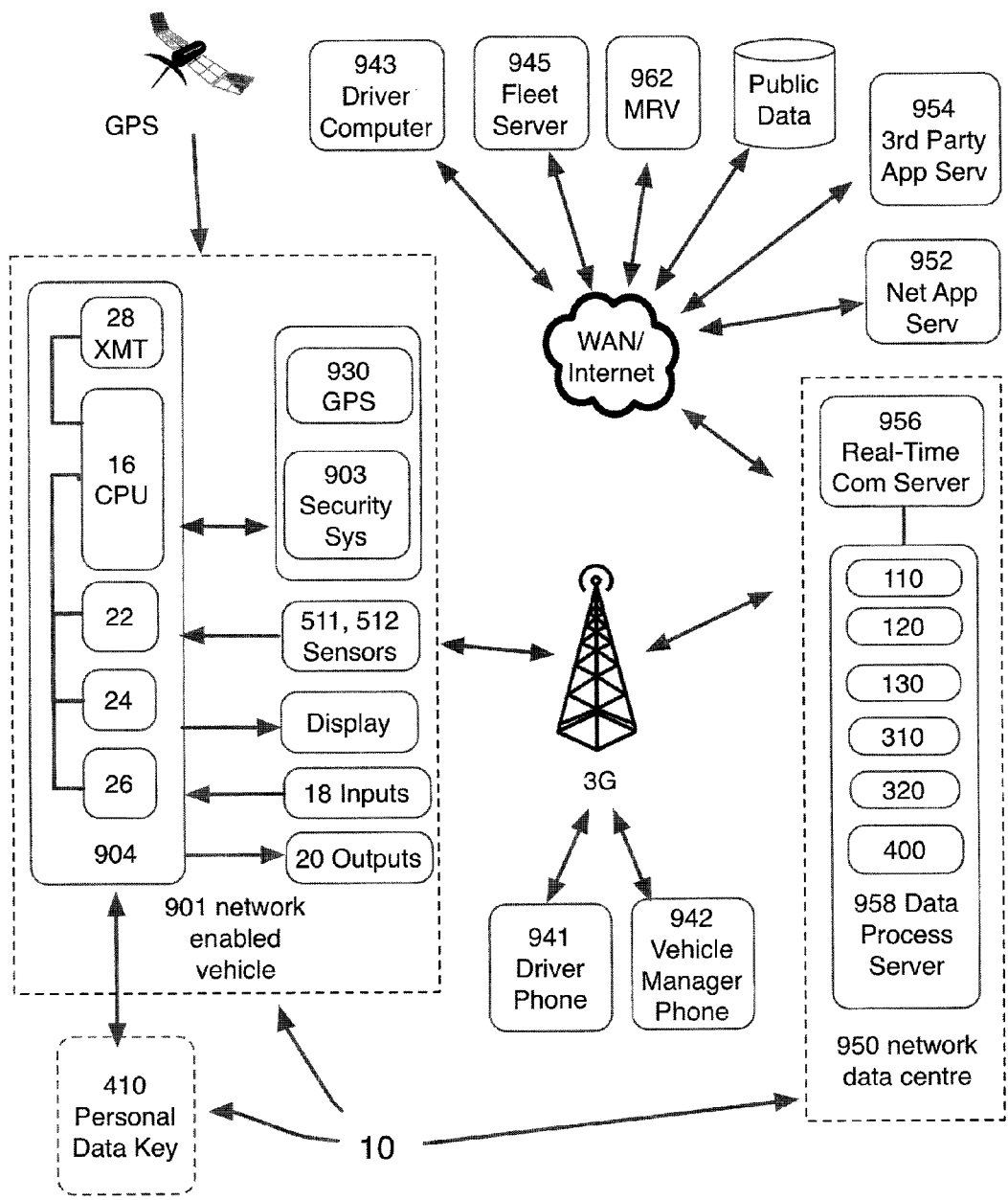
FIG. 1 is a schematic diagram of an exemplary vehicle analysis and operational system showing the hardware, firmware and software components of the invention and how they interface within the system and with $3^{rd}$ party systems to provide optimized vehicle routing.

The term "alerts," "commands" and "actions" may be referred to as "rules" herein for simplicity.

The term "preferences" refers to the user defined aspects of the invention including settings that are adjustable by drivers, systems operators, or automatically by analysis systems or network control operations, and can include adjustments made on a real-time basis or based on historical use.

The terms "network" and "mobile data network" can be used interchangeably with mobile network, data network or network without limiting their meaning, and includes the use of 2G, 3G, 4G, WiFi, WiMAX, Wireless USB, Zigbee, Bluetooth and satellite, and for convenience can also include hard wired connections such as internet, ADSL, DSL, cable modem, T1, T3, fibre, dial-up modem or the use of flash memory data cards, and USB memory sticks where appropriate.

The term "vehicle operation system" can refer to any component in this invention and its network and to any or all of the features of the invention without limitation.

The term "hardware" includes, but is not limited to, the physical housing for the on-board computer as well as the display screen, connectors, wiring, circuit boards having processor and memory units, power supply, secure digital cards, and other electrical components.

The term "firmware" includes, but is not limited to, program code and data used to control and manage the interactions between the various system components on-board the vehicle and communicate with off-board systems.

The term "software" includes, but is not limited to, program code that performs the computations necessary for calculating routes, the reporting and analysis of vehicle specific data, displaying information, and, managing inputs and outputs. Software can be both on-board and off-board, and a combination of multiple systems.

The terms "operator," "driver," "user," and "owner" are used in context to describe the association of a person with a vehicle and the network and may in some cases be the same person.

The term "vehicle centric" means a focus on virtual data or remote services that support the use cases of rules and applications on a vehicle operating system, in a process designed to reduce the processing burden on the vehicle operating system, while still providing rich data for the operators and drivers.

The term "fuel" means available energy such as but not limited to the electrical potential stored in a battery or the potential energy that can be created in a fuel cell, or the amount of physical fuel in a tank.

Unless defined otherwise, all technical and scientific terms used herein have the same meaning as commonly understood by one of ordinary skill in the art to which this invention belongs.

The present invention provides a vehicle communication, analysis and operation system, including hardware, firmware and software for managing vehicles by employing continuous inputs from a vehicle and intelligent correlation with analysis techniques to optimize the driving experience. Correlation analysis techniques enable a software system to self-discover and study the relationships between variables. It understands how one metric relates to the variability of another. A rule based system is used to manage the data operations of a vehicle. A vehicle that is in a communications link with a network can also manage its activities based on real-time, historical and predictive knowledge, without having all this knowledge processing on-board. Such data processing can include the geo-spatial information, internal vehicle functions and operator specific requirements. The rule based or analysis system can also incorporate the use patterns of a specific vehicle, and/or a specific user. A use pattern can be transferred from one operator to another or be shared to assist with navigation and operations. A vehicle operator or vehicle multiple operators or a vehicle network component or a vehicle in communication with another, can share or upload information to assist with efficient operations, including fuel conservation and time management. Use patterns can be assigned to geospatial regions and be used for comparative analysis for such activities as efficient operation, safe travel, social media applications and navigation.

The present invention provides a vehicle operations system, including network and communications infrastructure, in order to optimize vehicle performance and provides numerous benefits including but not limited to connection to third party communications systems that will allow for tracking of position. The real-time processing of this information allows for vehicle performance optimization; the reduction of network load by pre-processing of data; and the support via a display on the vehicle to allow internet based commercial and social services to be shared by drivers, operators, internet communities and other parties of interest such as marketing and third party service solutions.

In accordance with an aspect of the present invention, there is provided a system in which the operational conditions of a vehicle include but are not limited to an internal operational state, near space traffic events, regional topography, patterns of use, and relationships with other vehicles and where the real-time, historical or predictive state or conditions are used in a system that collects internal information from the vehicle, or driver, or a combination of the two and shares this information on a private or public network. Such a system can provide further analysis and reporting back to a driver, operator or vehicle. Such a system may store such information on a mobile network where it may assign indices, use pattern data or raw data to a vehicle, driver, specific location, or region.

Exemplary Vehicle Analysis and Operations System

Referring to FIG. 1, there is shown a diagram of an exemplary implementation of a vehicle communications, analysis and operations system, generally designated 10 (and hereinafter referred to as the "vehicle operation system"), which includes system hardware, firmware and software components and how they interface within the system 10 and with 3rd party systems. The vehicle operation system 10, designated in FIG. 1 using dashed boxes, includes a vehicle 901 equipped with a programmable vehicle data system 904. The vehicle data system 904 contains a processor (CPU) 16 and a ROM 22 and a RAM 24 coupled to the CPU 16. The ROM 22 has multiple inputs 18 and outputs 20 and contains firmware which provides static information and instructions to CPU 16. The RAM 24 contains software that performs the computations necessary for calculating routes, reporting and analyzing of vehicle specific data, displaying information, and managing inputs and outputs. The vehicle data system 904 also includes a data storage device 26, coupled to the CPU 16, for storing user inputted, real-time, and historical data, and a transceiver 28, coupled to the CPU 16, for transmitting and receiving data over a wireless communications network.

Inputs 18 and outputs 20 can be any known in the art that allow the vehicle data system 904 to receive and communicate logical data with for instance a user interface; such as but not limited to a display, audio system, keyboard; USB, flash, Bluetooth, near field communication or other data transferable ports and mediums; and factory or $3^{rd}$ party installed vehicle systems. As also shown in FIG. 1, the vehicle 901 is also equipped with a security system 903, a GPS (or other navigational system) 930, operational sensors 511 and environmental sensors 512. The vehicle data system 904 can also be configured to communicate with the security system 903, the GPS 930, the operational sensors 511, such as accelerometers and optical spatial sensors, and the environmental sensors 512 such as CO, NOx, temperature, noise (dB) and humidity sensors, a vehicle's energy management system, or a vehicle's operations system.

The RAM 24 of the vehicle data system 904 contains system software for determining the most efficient route or travel plan based on a vehicle's real-time data, a vehicle's centric data collection, and assigned use patterns specific to the vehicle, a driver and/or a geospatial region. The system software of the RAM 24 may include a data management and processing system, generally designated 30 and illustrated in FIG. 2, which shows data processing modules 100, 200, 400 and database 300 used within the vehicle operation system 10. The processing modules are separate software modules, but not separate processor/memory systems in their own right. Some of these modules are on-board and some are off-board vehicle 901; some of these modules can be either off-board or on-board subject to detailed design decisions.

Planning and display of travel plans and travel plan updates within planning modules 200 and multi tiered database 300 for data collection and management are part of the on-board vehicle data system 904. Neither the pattern analysis processing modules 100 nor the personal data modules 400 need be on-board; those modules can be run at network operations and data centre 950 of the vehicle operation system 10 seen in FIG. 1 or other networked computers and/or servers. Personal data key 410 has a user's preferences and vehicle/driver use patterns and can be in communication with vehicle data system 904 on-board network enabled vehicle 901.

Referring again to FIG. 1, the network operations and data centre 950 contains a real-time communications server 956 in communication with a data processing server 958. These are shown as separate servers in communication with each other in FIG. 1 but they may also be part of a single server. The real-time communications server 956 collects and communicates real-time data from vehicles and drivers within the network as well as from $3^{rd}$ party and public data systems. Data processing server 958 contains system processing module specific firmware and software for managing and processing disparate data; including vehicle specific data 110, public data 130, and vehicle and driver use pattern data also referred to as efficiency data 120 which can be categorized within the pattern analysis modules 100 (shown in FIG. 2). Real-time analysis 320 for analyzing real-time data and historical database 310 for post processed data along with personal data modules 400 can also be employed within data processing server 958. The data is synchronized, correlated and packaged for use by on-board trip planning modules 200 to provide dynamic mapping of vehicle routing also referred to herein as travel plans 210 and updated plans 220; and to communicate them to vehicles and users within the network, including vehicle 901, driver's phone 941, driver's computer 943, a fleet manager's phone 942, a fleet manager's computer 944, a fleet server 945 and $3^{rd}$ party systems such as mobile rescue/refuel vehicle 962.

In another embodiment of the system, vehicle data system 904 may be a user's smartphone, configured to communicate with other entities within the vehicle analysis and operation systems network as well as with systems on-board the vehicle and remote $3^{rd}$ party systems.

Data Management and Processing System

Figure 2:
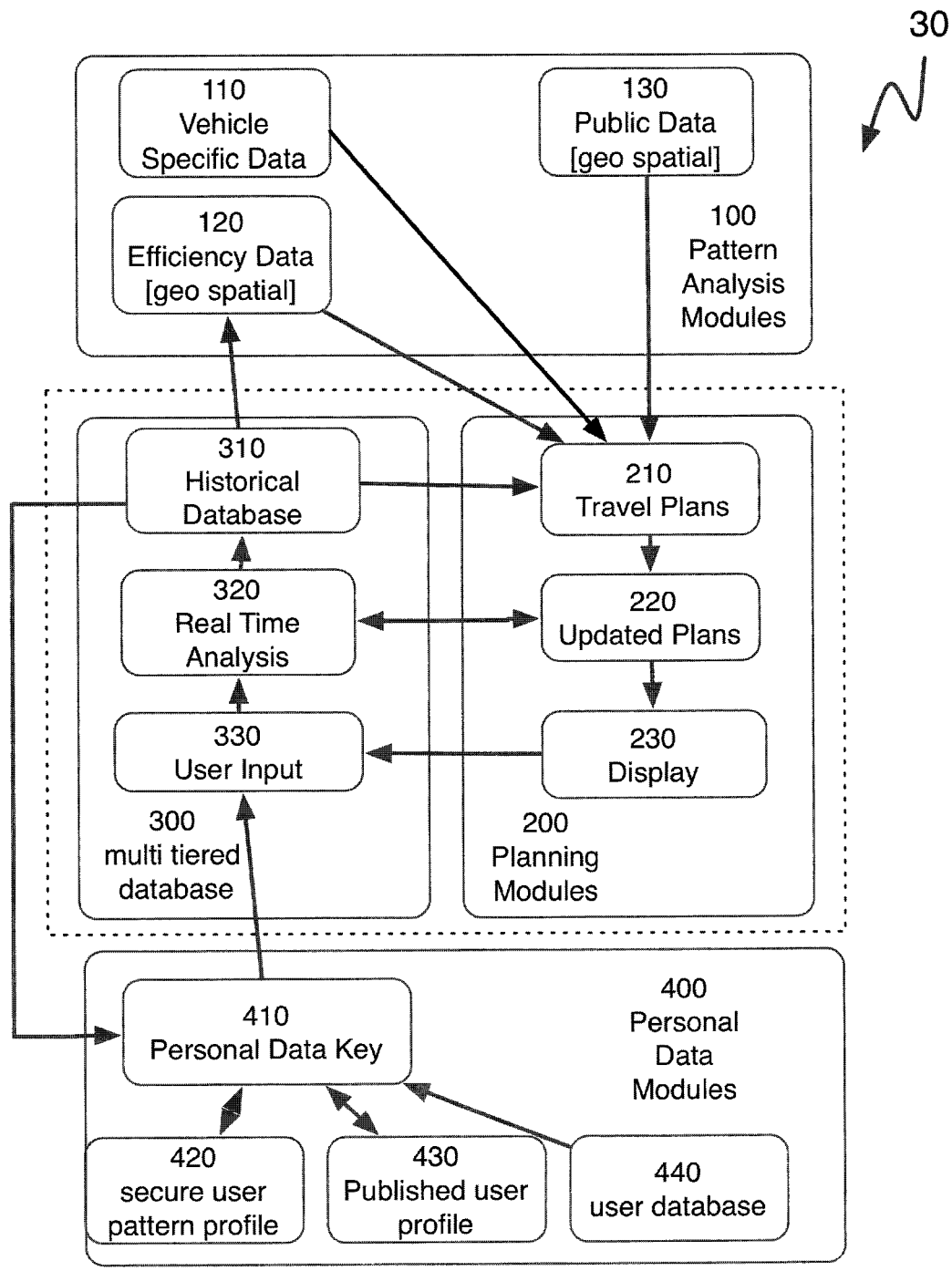
FIG. 2 is a data management and processing system schematic showing data processing modules and directional flow of data for a vehicle operation system.
Figure 3:
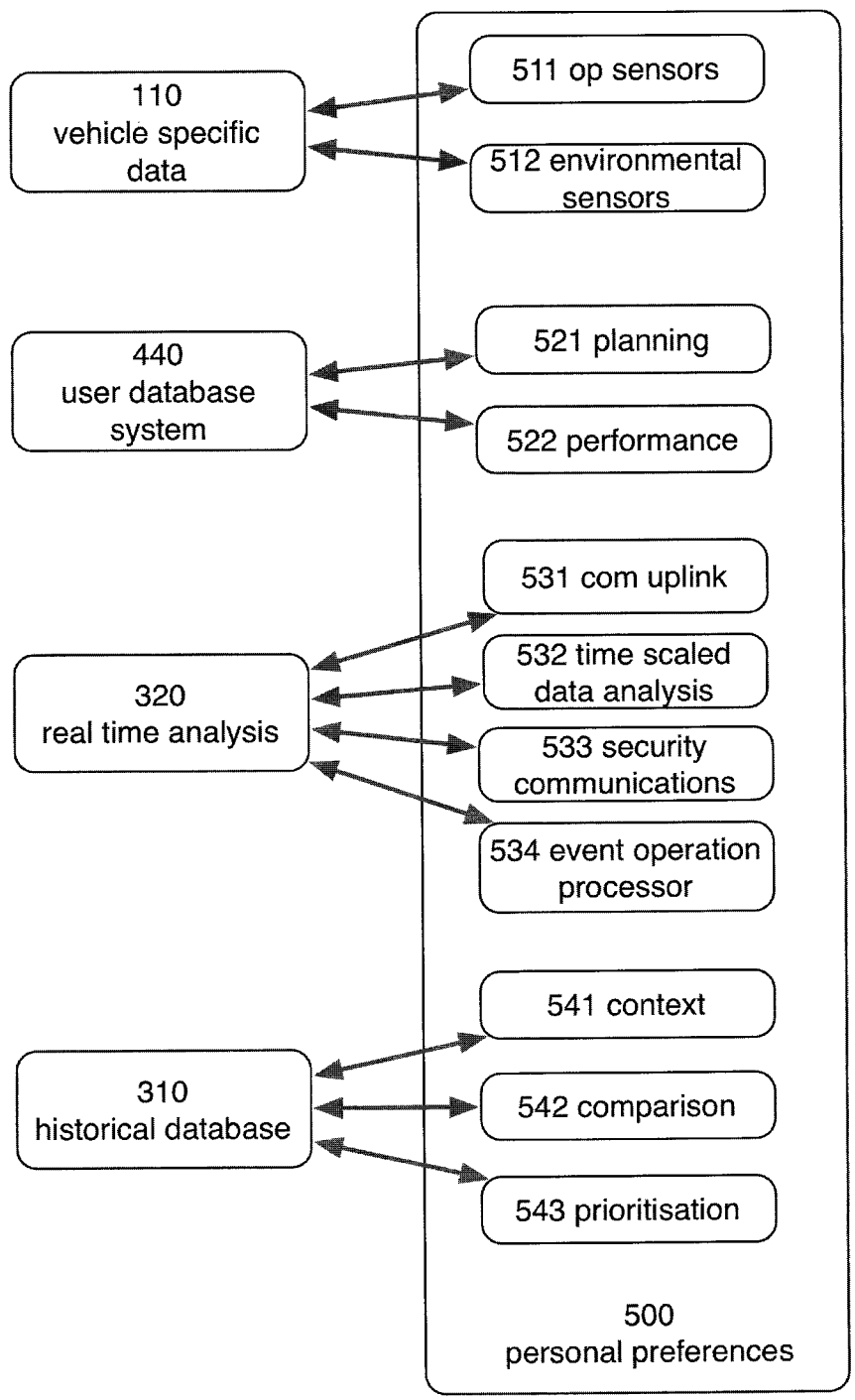
FIG. 3 shows user configurable settings and preferences within the vehicle operation system.

In FIG. 2, there is shown the data processing modules 100, 200, 400 and database 300 of the data management and processing system 30 used within the vehicle operation system 10, FIG. 3 shows user configurable settings and preferences 500 within the system 30. There are five categories which can be used to describe features and components within the data management and processing system 30, namely, external and geo spatial data of the pattern analysis modules 100, planning and display for travel plans and travel plan updates within the planning module 200, multi tiered database 300 for data collection and management, personal data modules 400 and user preferences 500 (see FIG. 3). The arrows between the modules are representative of the directional flow of data between the processing modules, either in a unidirectional or bidirectional flow of data. These processing modules make up a software package required to perform the disparate processing functions of the vehicle operation system 10 of the present invention. Some of the software modules are run on a network enabled vehicle 901; some are run on off-board computers and servers within the network including network data centre 950; and some are run both on and off networked vehicle 901. User software can also be installed on user computer systems such as vehicle data system 904, a driver's computer 943, a vehicle manager's computer 944, and a fleet company's server 945. The user software processes user and vehicle specific packaged data derived from vehicle and driver use patterns also referred to herein as efficiency data 120, vehicle specific data 110, user settings and preferences dependent data and third party data such as localized geo spatially relevant public data 130 containing mapping utilities, grade, elevation and traffic systems for a localized area.

The data management and processing system 30 uses the multi tiered database 300 which comprises three major distributed parts, namely, the vehicle centric data collection or user input system 330 (on-board networked vehicle 901); the real-time communications and analysis system 320 (on and off-board networked vehicle 901); and the post processing or historical database 310 (on and off-board networked vehicle 901). The vehicle centric real-time data may be used to manage a vehicle without dependence upon a real-time communications uplink 531. It can provide analysis based on sensor data (from operational sensors 511 and environmental sensors 512) and this can be combined with user or system updated patterns. The real-time communications and analysis system 320 includes: vehicle centric data including any on-board vehicle data such as the vehicle's operations and energy management systems; data from post processing or historical database 310; data from third party systems such as public geo spatial data 130; and data from other vehicles. The post processing database also known as the historical database 310 can create user context specific information, and more generalized scenario management which may be used to provide the basis for database comparison 542, prioritisation 543 and content 541.

A context driven analysis system allows for specific use cases to be analysed using a variety of mathematical algorithms. Such an analysis can be performed outside of the real-time interface database. Such comparative systems allow for data to be used in a combination of randomized and deterministic algorithms where their use depends upon previously known or preset relationships, where the probability of an event or anomaly detection is dependent upon the normal operations of a vehicle in comparison with real-time data or with post analysis data or user determined settings. In essence a set of operational parameters establish the normal expected response. Based on variations in operation performance or expected performance a set of business rules or operational guidelines will be automatically enabled. In one aspect of the vehicle operation system 10 of the present invention, the prioritization of actions are broken down into use case processing that is dependent upon user associated rules or reporting requirements.

One aspect of the vehicle operation system 10 of the present invention is to include a systems user profile that can either manage the preferences of the user or set automated prioritization based on prior use. Such prior use may include vehicle operational habits such as acceleration, route track, time of day, as might be used to characterize the normal human impacts on a vehicle. Such a user profile can be transferred to different vehicles or used in a comparative analysis to optimize the use of vehicles in a similar pattern, using either real-time analysis systems or post analysis. Patterns of analysis can be used to describe the user preferences for distinct geographical areas, allowing vehicle performance optimization or driver guidance to avoid or manage areas of complex navigation or allowing driver social media applications.

The rule based system, as will be discussed herein below under the sub-heading "Rules", has both vehicle centric and networked components and the vehicle 901 can drive either autonomously or in real-time communication with it's networked guidance systems. Vehicle centric systems allow for optimization of vehicle performance parameters using predictive methods that interpret such characteristics as slope, location and speed. For example wheel torque under constant rotation speed, or speed under constant torque or regenerative braking can thus be modified to perform based on anticipated conditions, and real-time performance versus expected performance can be shared amongst vehicles on a similar route. Control elements such as a continuously variable transmission benefits from such anticipated actions to manage fuel consumption or regenerative brake use. Certain vehicle use cases involve a rule based system to optimize user variable software tools, and enable communication with both vehicle centric or networked software tools or games. Certain types of vehicle centric data can be shared between vehicles and the data can be packaged as the solution to multiple algorithms such as piecewise functions including polynomial representations of data intervals.

With the vehicle operation system 10 of the present invention, predictive analysis can be applied to many vehicle use cases. Active analysis of a vehicle can be used to both optimize and share vehicle performance characteristics. Vehicle telematics can be used in conjunction with network components, including computational precedents from apriori analysis, in order to optimize fleet management and predictive analysis, such as use, availability, maintenance, safety, security, social media applications and refuelling. Navigation systems can further optimize the systems performance to create route preferences based on immediate requirements, such as home-base return power calculations including potential energy requirements, total energy available, kinetic energy capture, fleet requirements, fastest route, shortest route, most fuel efficient route or safest route. Mobile data can be shared in two way communication with the vehicle and the management systems enabling real-time optimization of third party software including games and fleet functions.

Reporting System

A reporting system 600, described in detail hereinafter in reference to FIG. 5, packages data to simplify usage trends from vehicle systems use to drivers and network operators. The report of specific vehicle operations to drivers and network operators and other interested parties such as vehicle manufacturers and marketing agencies, allow them to be more intuitive about the ongoing operations on-board vehicles without the need for a constant data stream. Data processing creates a predicted operational profile and a post analysis profile which can be presented as an algorithm interpolation and the comparison of the variables can be efficiently made without ever having to transmit all the vehicle data. Such data sets can be scaled to manage data transmission such that only change related data in the form of an algorithm variable needs to be transmitted either to or from a vehicle. Such processing of data optimizes the use of data such that in many cases the transmission of some data does not need to be transmitted in real-time via a mobile network. This is particularly the case for high resolution data that does not represent any significant change, the on-board vehicle processing system being able to determine the relevance or significance of data intervals. Some data can be stored on a network server or on-board the vehicle and transferred between the vehicle, the server, the driver or other networked component, on or off the vehicle or other vehicles, by a mobile data system such as either a Wi-Fi, drivers personal data memory card, or when network demand is reduced. This will have a dramatic effect of the scalability of the systems, allowing the smallest packets of real-time data transmission and reducing the network burden.

The data stored on a network server can be mined for anonymous vehicle profiles and driver profiles for use by marketing agencies and vehicle manufacturers to improve on their designs and better understand customer use cases, operational criteria, and other factors leading to customer value propositions and requirements and market evolution factors. A change report can be in the form of a difference between the predicted and actual performance, the routing performance, the battery performance, vehicle faults, driver preferences, driver performance, status reports, security reports and other variables as might be expected in the normal operation of a vehicle. Driver preferences can be in the form of pre or post driving questions that the driver or the network can generate to further optimize performance. These preferences can be shared with other drivers, or network operators to encourage best practice use patterns.

Operators and Managers and Associated Rules

A corporate fleet managed system has different operational requirements than a social group or an individual. A fleet might already have its own operational software and only be looking for specialized vehicle indicators only, such as time or distance to recharge, in order to manage deliveries or services within a certain area. In this case the need for performance criteria is very much determined by the practical business rules for the fleet. A social group might wish to optimize their group performance to drive where there is little traffic or along a scenic route, or drive as an input to a game scenario. An individual may wish to improve the personal driving habits or refine route preferences while driving.

Vehicle identification can be in the form of a personal profile of the driver, and a profile of the vehicle performance or some combination of these features. A driver may have a performance profile that can be used to modify vehicle performance criteria to suit the driver, for instance, route profiles, or the actual physical characteristics of the driver such as height and weight may change the predictive route mapping, or other on-board vehicle parameters such as torque/speed or suspension settings or ergonomic factors such as mirror or seat adjustments.

As a result, the invention allows for the real-time vehicle adjustments, and post analysis all which can be made based on type of vehicle, driver history, regional driving trends and conditions, and associative relationships between vehicles.

The invention calls for multiple vehicle communications methods within a distributed operational system with a mobile data network including cellular, Wi-Fi, internet and other methods as is known to one familiar with the art. A subscription model can allow for web enabled social networking of vehicle communications on a use case basis.

Separate Entities in a Distributed Network

Each vehicle system is designed to operate with or without the communications network. The vehicle is always associated with a user profile, whether it is owned, leased, rented etc. The vehicle/operator pair become a rule specific entity in a distributed learning network whereby the identity of an operator can be used to drive any vehicle, and that vehicle will by nature of the operator data, take on the preferred characteristics of the operator into its vehicle centric operational system.

The vehicle/operator pair are the top tier in computational performance, a vehicle centric system is supported by the communications and post processing data layers. In this manner, if the communications link with the network is not available, the vehicle centric system can continue to function in a predictive manner, by using a priori data.

In this manner a vehicle that is following a known route can also follow known patterns of use, regardless of if the communications link with the network is active. A driver or network operator or an automated system can use the use pattern data to characterize route preferences that allow for easy interpretation of local conditions in a predictive or real-time situation, such interpretation allowing for the intuitive display of such information.

Personal Data Key

Knowledge upload to a personal data service key 410 (see FIG. 1 and FIG. 2) can occur using a mobile data network link such as a web enabled hotspot or cellular phone. Certain operational preferences can be uploaded to an operators personal data key 410, and these transferred to the vehicle on start-up or during operation. This allows for certain operational parameters to be set such as mathematical operators such as algebraic or functional analysis, computational limits such as time and resolution, and optimized algorithms to reduce data set size.

In one embodiment of the invention there is called for a personal data key 410, and the uses of certain patterns of operation, certain digital codes as might be input on a keypad, a pattern of use and a combination of physical hardware such as a subscriber identity module or SIM card, or other hardware or software key that might be uniquely attributed to either a driver or vehicle in order to transfer operator, driver or vehicle data for a specific vehicle use case. In such manner a vehicle can be secured to be functional in a specific manner only, for instance for fleet operations, or for a specific time period or specific user or group of users only. It is possible that a vehicle can be secured to accept the use keys of multiple drivers or guest drivers, and that driver preferences can be adapted to associate with multiple vehicles, such as rental vehicles for instance.

In one embodiment, a use case for a security system 533 (see FIG. 3) is the integration with commonly understood geomatics technology. Owner/operator preferences adjust the sensitivity of a security response to real-time data, and can also provide notification of a vehicle optimal state to manage the geospatial conditions. Further the vehicle can incorporate geospatial analysis or patterns to ensure that the vehicle is being operated in an optimal state.

In the case of antitheft requirements, an owner/operator preference based system may be deployed that allows the set up and authentication of systems at the point of purchase, allowing manufacturers to defer the cost of verifying network installation prior to shipping. In this case a separate personal data service key 410 or SIM can be separately installed using an interface standard such as a hardwired: USB, ethernet, serial, proprietary, parallel; wireless: transponder, Bluetooth, Wi-Fi (802.11a/b/g/n), Zigbee, wireless USB or other connection. This separation of the digital authentication from the vehicle can be used to disable some functions on the vehicle making it more difficult or impossible to drive, or setting a communications based alarm or other reporting functions as might be part of normal vehicle operations.

The personal data key can have two physical components allowing the vehicle key to be used separately from the user preferences data 500 (see FIG. 3), or allowing a driver to have multiple vehicle keys and a vehicle to have multiple drivers.

The personal data key 410 can be a programmable digital key that records certain driving habits and as such becomes the storage medium for the driver personality data. This personal data key 410 can also allow for group data and social media data to be stored in preferences. The personal data key 410 relates the vehicle to the driver and driver to the vehicle, enables security activation, normal operator instructions, directions and other data as might be considered useful such as social data and applications. A driver's smartphone can be used as a personal data key.

Separate Entities in a Network

Each vehicle and operator is a separate entity in the network. This allows for either a vehicle or an operator to be associated independently. A vehicle might allow multiple operators for either personal or business reasons, and a driver operator might have his or her profile associated with multiple vehicles. The vehicle and driver environment can be constantly updated based on the predetermined preferences or settings. These preferences can act as inputs to a rule based system further allowing for optimization of real-time processing requirements due to the limited need for complex multivariate change analysis. For instance, the predictive aspects of what is happening on a driver's display can be displayed or shared on a network without a real-time update.

In one embodiment, a vehicle can be equipped with a vehicle data system 904 having a display with a multi-screen or layered ability. The screen may have security features such as not allowing some functions to display while the vehicle is in motion. When some characteristic of the driving conditions changes from what is normal or what is expected, then there can also be a change in the communications between the vehicle and the network. Transmitting normalized data such as the interpolated difference from predicted or normal operation, the vehicle data system 904 can be updated to be viewed either on-board the vehicle, or on a networked screen at a different location or on another vehicle. Accordingly the invention allows for an on-board or networked vehicle data system 904 to display either the actual high resolution data or the normalized data. This can be done in real-time or in a more optimized fashion to reduce network data load. A vehicle data system 904 can replace or be next to a conventional analog dashboard, or components can be represented on a heads up display on a windscreen or helmet screen. In this way the rule based system can examine data in a prioritized manner based on the degree of change and this can be further optimized by predetermined priorities in data management, for example, one vehicle may have greater priority over another for security or emergency requirements. Vehicles with refuelling risks may be observed with a greater resolution of the vehicle data in order to reduce the challenges to the driver to manage destinations, stops and routing efficiency. Some geographical areas may require more efficient or higher resolution data analysis based on prior experience or by information provided by recent vehicle reports on the same route providing both drivers and network operators the opportunity to interpret optimal driving conditions.

Communications Between Network Entities

In another aspect of the vehicle operation system 10 of the present invention, a geospatial area or location may have characteristics that are assigned to it that can serve to automatically update driver or vehicle preferences and enable the use of geospatial preferences as a means of searching a routing database to see which areas have been tagged with certain characteristics. Examples of this might be an area with bad road conditions, an area that stresses vehicle operations, an area that is difficult to navigate, or an area that has been noted as notoriously dangerous. In this manner both vehicle performance and driver input can be used to identify driving characteristics. Driver input can be made in post analysis.

A vehicle in the network works as a separate entity able to determine some of the attributes of one or more other vehicles, referencing both historical and real-time information and able to provide limited processing ability on-board the vehicle or able to prompt the real-time communications and analysis system 320 by either an automated event or by user/driver prompt. Each vehicle entity is subsequently indirectly in contact with other proximate vehicles through the network for those vehicles allowing shared communication. Further communication with internet applications can allow a variety of third party shared user functions or applications.

Because the evaluation process and location determination of entities are spread over a number of vehicles or vehicle operator pairs, and there is vehicle centric pre-processing, there is a faster evaluation and less data traffic over the network than if the central database were used to perform all the analysis and reporting evaluations and location determinations or requests. Hence the operator can become part of the real-time programming process, and the results of his decisions are used in post processing analysis.

Additionally, each vehicle, and driver can have a set of rules that apply to them to enable the communications network. Each entity can reduce the amount of network data processing by examining data on an event basis, which will produce constant results for a time period. If so, an entity can, for example, eliminate the analysis complexity or the reporting requirements for real-time data.

Sensors

A vehicle with operational sensors 511 such as multiple accelerometers can derive the variations in conditions such as vehicle vibrations or acceleration in multiple axes. These in turn can be integrated to determine velocity or displacement. Patterns of accelerometer data can be used to characterize vehicle performance and when using pattern analysis can be used to determine vehicle operational parameters such as load, road conditions, tire and suspension performance. Other sensors such as optical spatial sensors for road surface condition determination and environmental sensors 512 such as CO, NOx, temperature, noise (dB) and humidity sensors can be used as inputs to a vehicle specific data system 110 as is known to one skilled in the art.

Driver actions are monitored on the vehicle centric system to allow for vehicle actions to be used as response mechanisms in the vehicle centric analysis system. For instance, an accelerometer system can monitor the vehicle turning, acceleration or braking and a series of events inclusive of any turning, acceleration, or braking can be used to either prompt the system or respond to the system. For example, a series of two or more accelerometers can be used in a steering handle which allows a driver to use tapping motions to communicate using finger taps while steering for instance without removing his or her hands from the handle.

System Operation

Reporting can be based on the results of spatial rules, and performed as specified for a spatial rule, or can be based on non spatial activities and actions on the part of the vehicle or operator which can then impact the weighting of spatial rules. A reporting action can include communications with a vehicle, where certain functions can be optimized for performance. Such rules allow for the integration of operator actions, predictive data, historical data and real-time data to be used to optimize vehicle performance.

For instance, an operation can be a prompt, or internal network validation method, or a command or message to the operator or driver to follow a path that is known to be more economical for fuel consumption rather than the shortest route.

Such a message might be in the form of a graphic as is typical of internet mapping functions such as Google Maps.

Alerts 620 and actions 640 (see FIG. 5), can be provided in other forms such as text messages, audible warnings including an interactive voice response system, graphics and icons to improve the simplicity of the communication.

The five categories used to describe features and components within the data management and processing system 30, four of which are shown in FIG. 2, include the external and geo spatial data of the pattern analysis modules 100, planning and display for plans and plan updates within the planning module 200, multi tiered database 300, and personal data 400. The fifth, user personal preferences 500, is shown in FIG. 3 along with the processing modules affected by a user's desired setting configurations and preferences. These are vehicle specific data 110, user database system 440, real-time analysis 320 and the post processing or historical database 310.

The vehicle specific data systems 110 can include but are not limited to such operational sensors 511 and environmental sensors 512 to measure, battery level, real-time battery demand, torque, regenerative braking status, speed, direction, motor temperature, battery temperature and tire pressure, temperature, and humidity measured at the vehicle, accelerometer data about road surface, grade, or air quality. These may be used separately or in combinations to enhance vehicle operations especially energy efficient travel. Public data 130 can include information such as grade, elevation, temperature, traffic conditions in a mapping utility that can be used to evaluate the most efficient trip. A historical database 310 is used to enhance the geospatial data to assure that patterns from various vehicles can be compared to evaluate the most efficient trip with the efficiency patterns data module 120. This in turn can be processed via a real-time analysis system 320 database for later use or for context driven comparison for other unrelated vehicles. In combination these elements can be used to create dynamic mapping that provides efficient travel plans 210 and in combination with real-time data can provide a real-time analysis 320 and an updated travel plan

220. The ability to update plans in real-time provides a measure of efficiency, and the display 230 of this to the user allows for user input 330 to impact further decision making. Drivers can also respond to prompts from the system using physical movements measured by sensors or other methods such as, speech, audible or visual cues. The real-time analysis system 320 shares data with the updated plans module 220, captures data from the user input database 330, and the vehicle specific data 110 and then performs an iterative analysis that updates the personal user pattern profile 420, and the historical database 310. This is managed through a secure communications uplink 531, a time scaled data analysis 532, and security communications 533. The historical database 310 can share information on the basis of post analysis modules including context 541, comparison 542 and prioritization 543 with the efficiency patterns module 120 and can have multiple tiers of data to be shared but secured at a private/personal level, a systems subscription level and a public level such as a personal profile to be published 430 that can automatically update to social media such as Facebook or Twitter. A personal data key 410 will allow personal data, vehicle data, and security codes to be used to verify operations of the vehicle and the systems interface, including updates from the historical database 310 to the secure user pattern profile 420, and to allow the system to update the published profile 430 and communication with a personal user database system 440 that allows for updates to user preferences especially those of planning 521 and performance 522.

Electric Vehicle Algorithms and Models

Electric vehicle optimization can be achieved with algorithms that incorporate vehicle performance feedback on a real-time basis in coordination with user specific patterns and shared data in an real-time network. The state of charge of a battery is one measure of performance on a route that can be used to compare patterns with other vehicles.

A dynamic algorithm is applied to generate a trip model and a driving cycle based on driver's itinerary input which includes geographical data; such as departure, destination, and preferred route and time data; such as departure time and arrival time. When the historical data of the preferred route is used to optimize the performance, the conditions of previous trips of the same vehicle or those of other vehicles can be used as reference. In a down scaling of traditional public traffic data, there may not be enough relevant data to provide a route adjustment, however, real-time data from other vehicles in a similar route pattern may give local information to adjust either the route or the drive cycle. A continuous Markov decision process is one method whereby a reward function can be calculated and associated with battery performance or other vehicle performance characteristics. These in turn can be compared to expected results. Further, a down scaling of data to respond in only certain circumstances, allows algorithms to be optimized to run only on demand or based on a trigger such as a change in vehicle performance, a time or a location based event. Such an event can be characterized by one of the many existing methods of monitoring of charge depletion control, however, the data can be used in an optimization based on historical patterns or in a comparison with predictive data.

The acceleration and deceleration model of a specific individual vehicle, that compensates for distances and times associated with speed change cycles, such as stop—start and slow down—speed up patterns, are used in a model where driving conditions and real-time assessment of event related analysis can include operating cost, energy use, spatial components of delay or surge in comparison to the anticipated results.

Acceleration, velocity and displacement can all be used in a model that further processes data to enable a comparative performance, on the same route, between vehicles, or between the same vehicle at a different time. Retention of peak and mean acceleration data for a period of a trip can be used rather than retaining all the data from the trip. Similarly a derivative of the displacement in a period or interest can be the constant acceleration, which can be compared to the instantaneous acceleration at any time. Performance measures such as total tractive force, mass, speed, acceleration, energy rate, efficiency parameter which relates to electric energy consumed provided by the power-train, an efficiency parameter which relates to electric energy consumed during acceleration, and efficiency parameters based on trip time, battery energy, dynamic state of the vehicle such as vehicle speed, regenerative energy, battery state of charge can also be used to create patterns of use on a route. These and other patterns of systems performance can be used to compare real-time vehicle operations to predicted values and be used by drivers to adapt driving techniques or select new routes to further optimize performance.

Furthermore performance criteria can be adjusted to provide the real-time data that can assist drivers to attain their immediate needs, which might be finding the shortest path, finding the quickest path, or using the least amount of energy.

Display of the data can be such that predictive parameters can be displayed in comparison to real-time parameters or historical patterns, and a suggested operational plan can be presented to the driver in order to meet the desired objectives. Such a display can compare acceleration, speed, distance or direction and make suggestions of these parameters.

Figure 5:
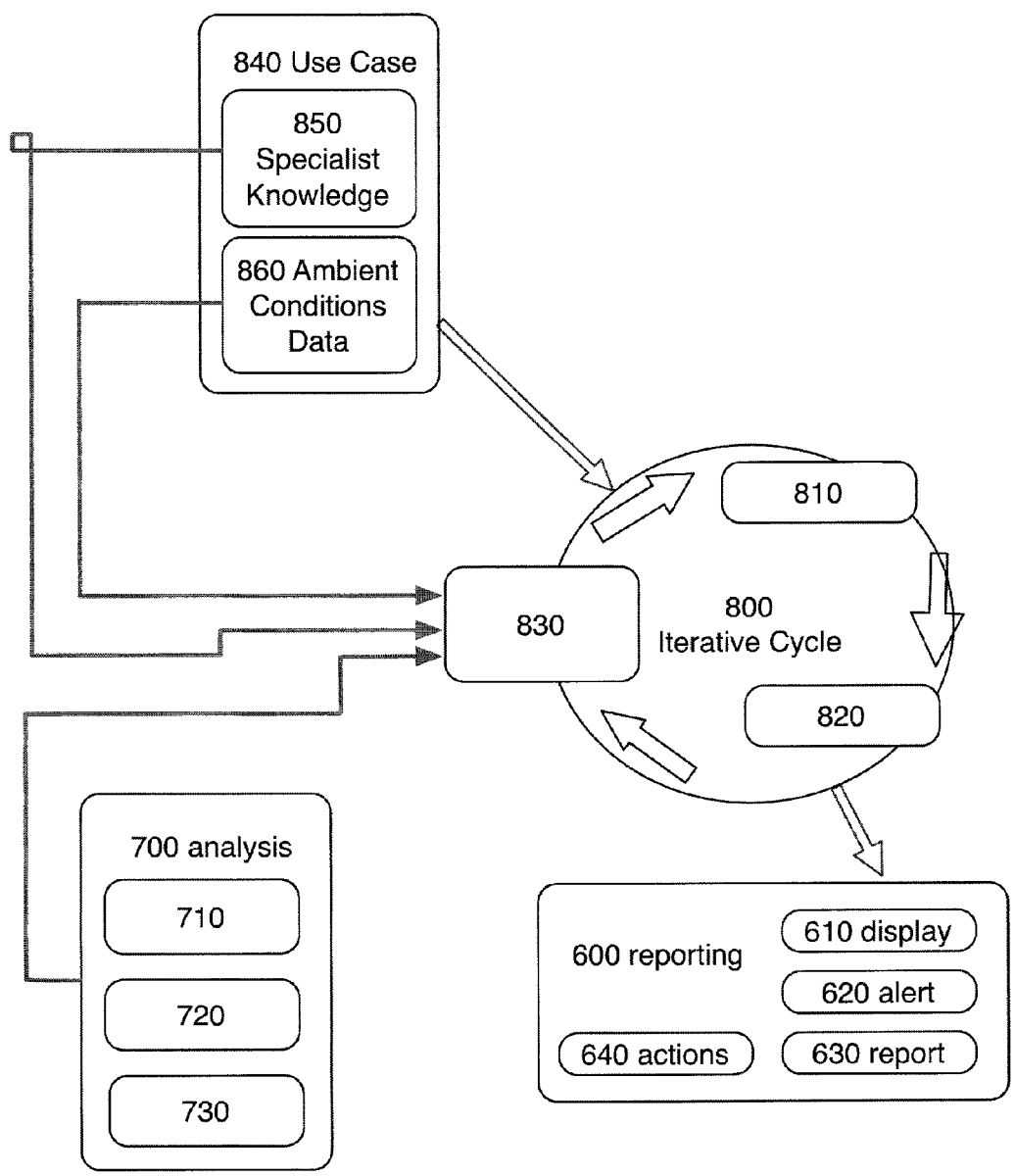
FIG. 5 shows the iterative cycle which allows the software to evolve over time and allows for increasingly complex scenarios for a well-designed dynamic vehicle operation system.

Referring to FIG. 5, the system operates in a reporting 600, analysis 700, and iterative cycle 800 process where each of these reporting 600, analysis 700 and interaction features provides an opportunity for vehicle drivers and operators to interact with the process to define their requirements.

The reporting 600 aspect of the network has three outputs, display 610 of relevant data, alerts 620 of events based on preferences, and the creation of reports 630 such as may be required to satisfy the rules of the iterative cycle or the display of real-time driving data. The reporting module gathers information from the vehicle centric systems and analysis modules, vehicle specific data 110, the driver user input 330, a historical database 310 or from public data 130.

The analysis 700 aspect of the network gathers information from the alert 620 and report 630 systems and also responds to events such as travel plans 210 and serves to update travel plans 220. The analysis aspect can have separate portions that function at the historical 310, real-time 320, user input 330, personal data key 410, or efficiency patterns data module 120. There are three components to the analysis module 700; computational 710, classification 720, and prediction 730. Accordingly the invention calls for the analysis of data to include the integration, derivativation or exclusion of certain events to be compared in a timeline using a variety of methods and types of algorithms whereby a predictive analysis can be made by comparing the prior events.

In the vehicle operation system 10 of the present invention, one type of decision and probability analysis consists of forward chaining where the existing data is combined with a process of making a logical judgment based on the apriori circumstances and conclusions that were used as the basis for apriori input to rules, and the use of these apriori inputs and circumstances to extract more data until a postulate can be made. The process using forward chaining searches the inference rules until it finds one where a logical truth can be inferred with some probability, a consequent which can add more data to the existing data, classification or rules around the apriori circumstances.

Yet further, another type of decision and probability analysis consists of backward chaining where an expected result can be used in context with the apriori circumstances and conclusions that were used as the basis for a-priori input to rules, and the existing circumstances or the results of forward chaining to determine if the circumstances for the expected results are likely and the probability of this.

In some cases the analysis system presents only the probability of a situation matching known apriori circumstances and conclusions and that these are always considered to have some weighting of accuracy. However for the simplicity of real-time calculations, the algorithm can sometimes use apriori data to match events with modus ponens inference.

The iterative cycle 800 aspect of the network shown in FIG. 5 has three major components including decision management 810, requirements 820, and rules 830. The rules component gathers information from the computational 710, classification 720, and prediction 730 aspects. The iterative cycle uses this information in the decision management context to update travel plans 220, to display options 230, to prompt for user input 330, to modify the published profile 430, and to validate the secure user pattern profile 420 and the real-time communications and analysis system 320; including the event operations 534, security communications 533, time scaled data analysis 532, and communications uplink data 531. The iterative requirements are preset by user preferences 500, or use case 840 including specialist knowledge 850, or ambient conditions data 860.

Communications and Decision Making Architecture

Figure 4:
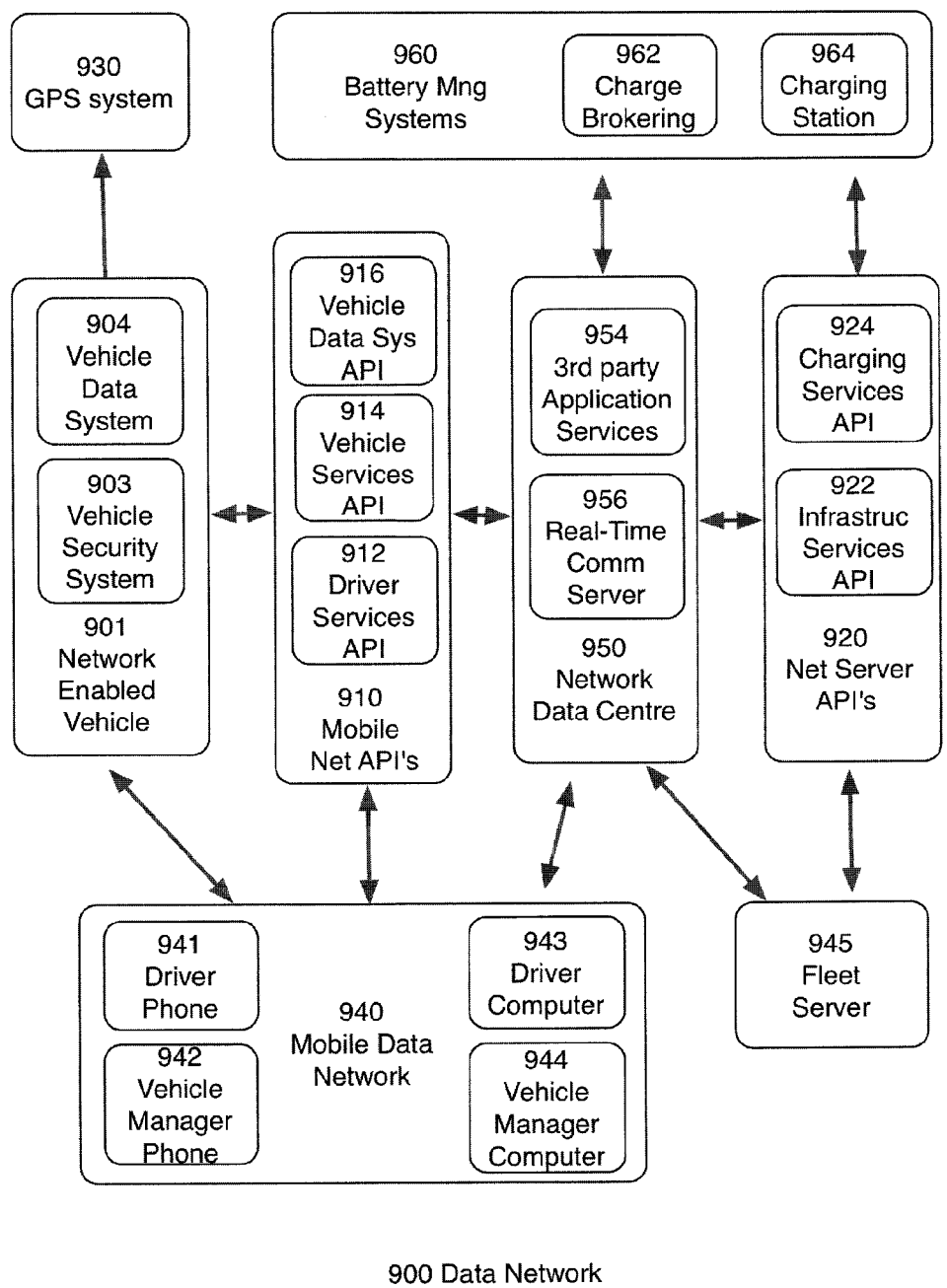
FIG. 4 shows the network components and communications modules and how they interact within a network.

The network 900 and its components are shown in FIG. 4 with reference to how the components are connected to the network using an application programming interface or API. There are the mobile data network API's 910 and the network server API's 920 which connect the vehicles 901 to the various services.

The vehicle data system API 916 is the API between network specific application services 952 or 3rd party data system application services 954 and the supplied libraries that will allow access to vehicle functions, or driver communication with functions, or with applications interface with local services. Examples can include functions to do driver notifications through a common queuing and display system, access track information or to populate additional layers on the map display with 3rd party info. Such an API can use a Java interface or other software standards as is well known.

The vehicle services API 914 is the API between data system applications and network data centre 950 that will allow access to information and services encapsulated therein. Examples can include access to historical track information, and real-time information such as nearby internetwork or intranetwork friends, as well as providing a conduit through the data centre 950 to any Internet based applications utilizing the network infrastructure services API 922 to provide fleet support, such as emergency road services for instance. Some aspects of the vehicle services API 914 are only available to network software modules on the data system such as session log-in, position reporting, whilst others are open to third party applications. This API can use a JSON or XML-based web interface with security and other enhancements or other software standards as is well known.

The driver services API 912 is the API between a mobile application such as a program running natively on the mobile data network 940 such as the driver phone 941 or vehicle manager phone 942 or other mobile device, and the network data centre 950. It allows access to a subset of functionality that is typically needed by third party mobile applications to interact with the network system and vehicles. Examples can include the ability to be notified of and control vehicle security events, driver safety, or other complex information to be pushed to the vehicle, or for the driver to update the network preferences or to message internetwork or intranetwork friends. This API can use a JSON or XML-based web interface with security and other enhancements or other software standards as is well known.

The infrastructure services API 922 is a set of APIs between third party applications which can be either Internet or mobile-based, that allow integration of independent software providers to support and be supported by the network eco-system. This API set can encapsulate the driver services 912 and vehicle services 914 APIs and then add functionality specific to fleets and corporate applications. It can be secured via a security certificate or other permission so to be available to approved connections. This API can use a JSON or XML-based web interface with security and other enhancements or other software standards as is well known.

The charging services API 924 is the API between network data centre 950 and battery management systems 960 such as charge brokering services 962 and charging stations 964; including battery management technologies, mobile charging vehicles and electricity or other fuel suppliers; allowing the secure exchange of information related to charging events, and the brokering of financial transactions for charging services by third parties, to the vehicle and drivers. Examples can include communications related to battery or charge point reservation, power and or battery pricing and actual charging transactions. This API can use a JSON or XML-based web interface with security and other enhancements or other software standards as is well known.

Figure 6:
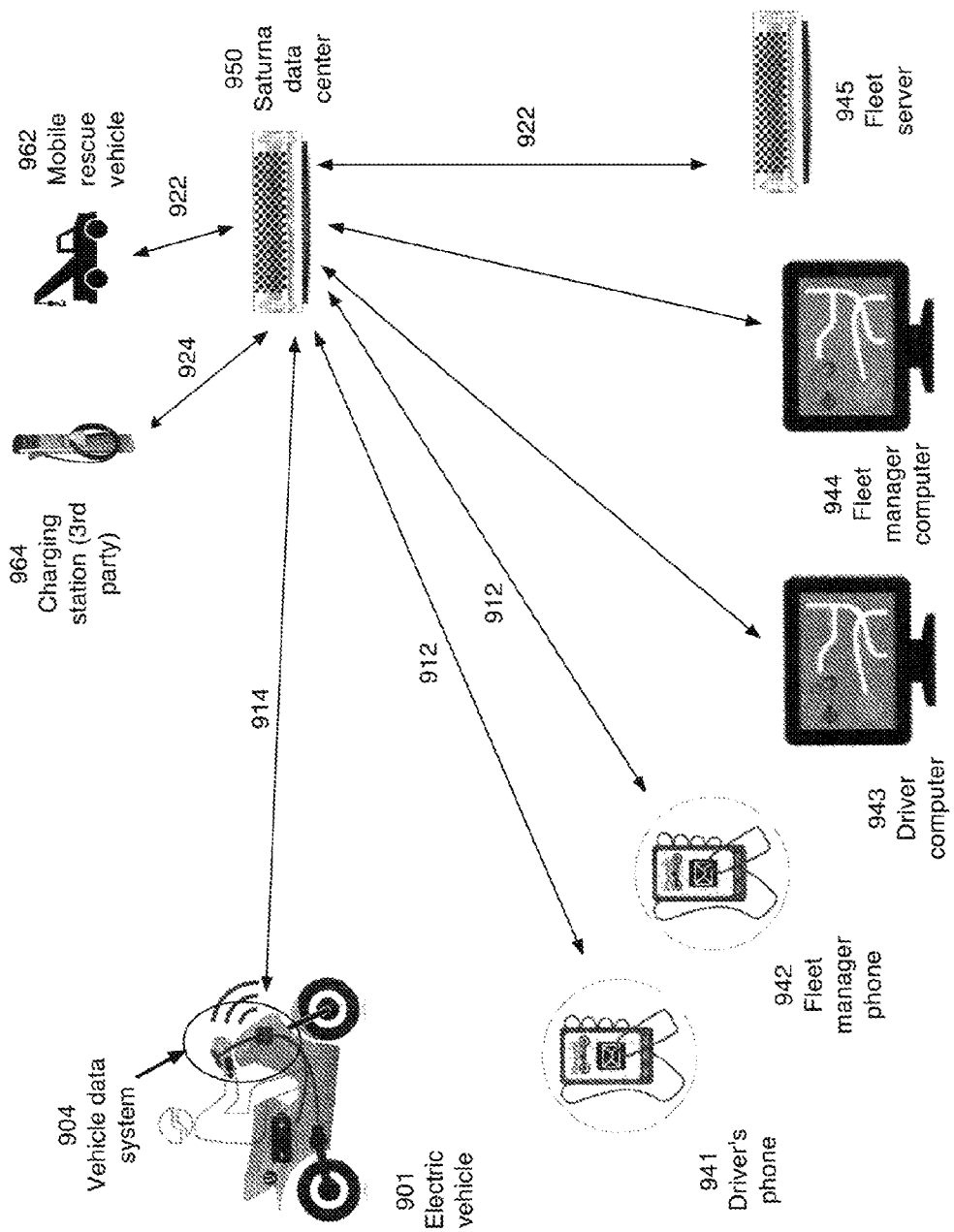
FIG. 6 shows an exemplary use case system architecture to illustrate the functionality of the system.

To better understand how the network components and their API's function in a vehicle operation system 10 of FIG. 1, an exemplary use case system architecture is shown in FIG. 6. A vehicle 901 shown in FIG. 6 as an electric scooter having a vehicle data system 904 is in communication with the network data centre 950 using vehicle services API 914. The scooter's on-board vehicle data system 904 is in communication with GPS system 930 for location determination. The driver's phone 941, and fleet manager's smartphone or handheld 942, which may also contain a GPS component, communicates with the network data centre 950 using driver services API 912. The fleet server 945 is in communication with the data centre 950 using an infrastructure services API 922. The driver's computer 943 and fleet supervisor's computer 944 communicate over the internet with data centre 950. Third Party services such as charging station 964 communicate with the data centre 950 using a charging services API 924; while a mobile rescue vehicle service 962 may communicate over a mobile network using an infrastructure services API 922 that includes vehicle services API 914.

The network architecture or components may be changed to allow for virtual infrastructure such as backup and recovery processes to improve efficiency, and mobility. Social media may have multiple impacts on architecture, including methods to protect the network from unauthorized use. As network usage expands to include clients, customers, and personal associative relationships, so does the need to improve and protect the personal information of vehicles, drivers, operators, or network components. Increased virtual communication across a network can improve social metrics and customer service and increase demand for hierarchal management and monitoring techniques. The network architecture can be adjusted according to the needs of security, including those features which include; web security, hacker attacks & denial of service, secure messaging, and other features as required, and known, to one skilled in the art.

Together, all these components form a communications system and mobile data network, which is designed to allow vehicle function with none, any, or all features in operation. Programming of preferences can be as simple as the systems monitoring the vehicle or driver operations, and making automated adjustments, or by the driver or owner or operator setting preferences either on the vehicle or by interfacing with the network including the personal data key 410.

Rules

A typical rule based system can be enabled on the basis of real-time events or by post analysis. There are typically application interfaces with business rules, or utility controls, and often in a network environment. In some cases a user interface can be used to allow communication with the rules to optimize functions. The programming techniques of rule based systems and expert systems are common knowledge to those familiar with decision management systems.

A set of rules 830 is deployed within the data network 900 in multiple centers of decision management. In the vehicle operation system 10 of the present invention, the technique of rule based systems is being used with a distributed architecture that will allow systems to function whether or not in communication with the network, and in doing so the rule based architecture on the vehicle is designed to primarily process real-time vehicle data, while the networked architecture is designed to monitor the results of the numerous vehicle rule systems, and compare these to expected results. User preferences can allow selective communication between the vehicle and the network, allowing some information to remain private and within the driver's personal network and post processing database, and some to be published to the driver's media portal and some to be published to the network operator's database for post analysis and sharing between vehicles. In this manner any number of rule based scenarios can be compared and managed for different purposes. A rule scenario for determining the fastest route through a city grid at a certain time is very different to a rule scenario that might determine the most energy efficient route or to sustain travel for an extended period. The priorities of rules and their weighting can change and enable the vehicle operator to determine what information to display on the user interface.

Conservation rules—include an effort to improve the use of a vehicle battery, a number of features on the vehicle are being monitored in order to allow for conservation of vehicle energy by suggesting performance criteria to the driver or by providing automated controls or alerts based on vehicle performance during certain drive cycles.

Social rules—include the ability to share information between drivers and vehicles in order to allow users to participate in internet based utilities or to share driver preferences and data. These can be further adapted to be specialized rules between certain vehicles for personal reasons or for gaming or business needs.

Reporting rules—include those rules where drivers may set the reporting requirements of a specific vehicle or their real-time or post analysis reporting to enable it to be used for processing in certain ways including performance measures to be used privately, or for sharing of data to enhance comparative analysis between vehicles and or between similar routes.

Rate of change rules—include an expected change happens within some time domain. Rate changes can be modified to alert on the basis of the first significant change and the preferences can be set for follow on alerts to assure the over sending of alerts does not desensitize the driver to significant detail.

Vehicle anthropomorphism rules—include the ability to create a profile for a vehicle that renders it to have simulated characteristics in its performance, or data reporting capabilities, or in its social networking such as a vehicle having its own cyber identity that can enable other vehicles or operators to associate with it given a rule based environment. Accordingly vehicles can be given features that are popular with other drivers or automatically associative with other vehicles and drivers based on physical features, vehicle type, vehicle owner or any other feature that might help to characterize the vehicle. Vehicle associative rules can interpret real-time vehicle performance data, driver entered vehicle profile, historical performance records, performance in a specific vehicle location, performance in comparison to other vehicles, usage data, environmental data and other relevant data to enable the performance, reporting or social networking characteristics of the vehicle to simulate human like characteristics. Such characteristics can include specific moods such as a change in dash color, conservative acceleration, and health indicators of optimal performance, vehicle situational opinions, such as preferred choices of route. Vehicle opinions can also include driver-vehicle, and vehicle-vehicle relationships modeled after a human relationship such as prompts from a vehicle that it has features in common with another vehicle, or that it has preferences for with respect to another vehicle, all customized by owners, drivers or operators to the cyber world.

Such rules may be implemented to interact with functions of the vehicle and may be weighted by the vehicle owner and or operator to help the vehicle meet environmental, operational, social, and ease of use requirements. These components of a vehicle operation system and mobile data network allow for many additional features and applications to be added to a vehicle and driver interface. In one embodiment of the invention, the network will allow for an interface for third party applications and services to be added on to the network at a network operator's or driver's choice. This interface can be in the form of an online store where the network sets the standards and performance requirements for vehicles based on any of the features in the total system.

The vehicle operation system of the present invention will now be described with reference to specific examples. It will be understood that the following examples are intended to describe embodiments of the invention and are not intended to limit the invention in any way.

EXAMPLES

Example 1

A vehicle operating system can examine travel records and indices for isolated areas to create a travel plan that will compare a proposed route for an electric vehicle to the data that has been shared by other similar electric vehicles in order to determine the probability of being able to complete a journey with a particular certainty. The database is mined for travel records from other vehicles that have traveled that route. Algorithms determine whether there is a quorate amount of data in the database, and if there is, then use the mined data to adjust any proposed route. This serves to resolve the anxiety that a driver might have about taking on a certain journey, including making stops or detours and still being able to complete the journey without risk of total battery depletion. By allowing drivers to modify plans simply by making vehicle operation changes, the real-time analysis systems can support adaptive processing based on prior known patterns of drivers habits, optimal vehicle performance and real-time or previously known conditions or changes.

Example 2

A vehicle operating system can use a personal data service key to enable the security features of a vehicle that identifies that vehicle and pairs the vehicle with the driver. In the case of a rental vehicle for instance, the vehicle automatically adjusts itself to the user preferences or settings of the driver such that the driver's rule settings do not have to be re-entered. A driver's rule settings may include their preferred route, driving style, range warning types and levels among others. The vehicle operational data can also be shared with the driver and the driver can have this secured onto the personal data service key in the event the network can not be reached by the vehicle. This can be used for instance to save driver patterns to identify a driver by subscription, driver style, billing preferences, insurance premiums, and other characteristics that can be attributed to driver/vehicle behaviour.

Example 3

A vehicle operating system can use network features to interpret the geospatial characteristics of a region to integrate with locally known or shared features of the region to enable a driver who is previously unfamiliar with an area to be able to take a route that satisfies rules for efficiency that otherwise are only known to those who have local knowledge. Drivers can adjust their response to proposed changes in routes based on their intuitive response and can accept or decline new route choices or prompt the network for further options including opening a call with a customer service representative.

Example 4

One commercial application is a location based service such as a proximity-based refuelling or recharging delivery service. In a typical scenario, a recharging merchant is notified when a low energy vehicle customer is within some distance of a mobile outlet and desires assistance, upon which the mobile refuelling or recharging service vehicle can assist the customer. Another commercial application is to apply geofencing solutions. Such applications are well known to one familiar with the art including commercial vehicle fleet operations. Custom-digitized virtual fences can be drawn on and around desired locations so that when a geo tracked and fenced vehicle or mobile user enters or exits a geo-fence, an alert or report is generated. An application of this is a mobile recharging/refueling infrastructure based on fuel status and fuel depletion rate rules in regards to route information, user profiles, and overall vehicle performance. Such a system can be used to create a real-time fuel management system that supports both individual vehicles and fleets of vehicles and provide a use case where the driver and vehicle will not ever be stranded.

The foregoing embodiments of the invention are examples and can be varied in many ways. Such present or future variations are not to be regarded as a departure from the spirit and scope of the invention, and all such modifications as are obvious to one skilled in the art are intended to be included within the scope of the following claims.

We claim:

1. A vehicle communication, analysis and operation system for managing vehicles and optimizing vehicle performance, comprising:
  a) a wireless network;
  b) at least one database server in communication with said wireless network, said database server comprising a multi-tiered database; and
  c) at least one vehicle capable of communicating with said wireless network, said at least one vehicle including an on-board vehicle data system having at least one memory unit, a central processing unit in communication with said at least one memory unit, a transceiver for communicating with said wireless network, a digital display, and at least one vehicle performance sensor;
  d) wherein said on-board vehicle memory unit is configured to store a first data processing module having instructions to configure the central processing unit to collect, store and analyze data from said at least one vehicle performance sensor;
  e) wherein said on-board vehicle memory unit is configured to store a rule based analysis system and a second data processing module having instructions to configure the central processing unit to employ inputs from said at least one vehicle performance sensor and correlation with analysis techniques such that said rule based analysis system manages data operations of said vehicle and when said vehicle is in communication with said wireless network, said vehicle can also manage said data operations of said vehicle based on real-time, historical and predictive knowledge, without all data processing occurring on-board said vehicle;
  f) wherein a user, vehicle or operational profile is created and stored in a user database which can be located on any storage medium capable of communicating with said wireless network including but not limited to on-board said vehicle, on-board said vehicle data system memory, on said database server or on a portable memory device configured to interface with said onboard vehicle data system and/or with said wireless network; wherein said user, vehicle or operational profile can manage preferences of said user or set automated prioritization of said driver or vehicle set preferences based on prior use of said vehicle to optimize use of multiple vehicles in a similar pattern, using either a real-time analysis system or a post analysis system such that
    i) data processing of said at least one vehicle sensor data can result in creation of a profile which can be presented as an algorithm interpolation and a comparison of variables can be efficiently made without all of said vehicle sensor data; and
    ii) data processing of said at least one vehicle sensor data can result in only change related data in a form of an algorithm variable needing to be transmitted either to or from a vehicle.

2. The vehicle communication, analysis and operation system set forth in claim 1, wherein said vehicle's data operations are optimized with respect to at least one of battery life, battery level, real-time battery demand, torque, regenerative braking status, or speed.

3. The vehicle communication, analysis and operation system set forth in claim 1, wherein data input from said at least one vehicle performance sensor includes any singular or combination of an internal vehicle operational state, near space traffic events, regional topography, patterns of use, and relationships with other vehicles.

4. The vehicle communication, analysis and operation system set forth in claim 1, wherein said data system has a multi-screen or layered ability such that said rule based system can display prioritized results of analysis.

5. The vehicle communication, analysis and operation system set forth in claim 1, wherein patterns of analysis of said vehicle sensor data are used to describe a user's preferences for geographical, vehicle performance, driver guidance, social media applications, and/or energy requirements such that a change report in a form of a difference between a predicted and actual vehicle performance, including variables as might be expected in normal operation of a vehicle being used in context with driver preferences to optimize vehicle performance.

6. The vehicle communication, analysis and operation system set forth in claim 1, wherein patterns of analysis of said vehicle sensor data are used to describe a user's preferences for geographical, vehicle performance, driver guidance, social media applications, and/or energy requirements such that real-time vehicle adjustments and post analysis of data can be made based on type of vehicle, driver history, regional driving trends and conditions, and associative relationships between vehicles.

7. The vehicle communication, analysis and operation system set forth in claim 1, wherein patterns of analysis of said vehicle sensor data are used to describe a user's preferences for geographical, vehicle performance, driver guidance, social media applications, and/or energy requirements such that a vehicle/operator pair become a rule specific entity in a distributed learning network and identity of an operator can be used to drive any vehicle, and a vehicle will by nature of said operator identity take on preferred characteristics of said operator into said vehicle's operational system.

8. The vehicle communication, analysis and operation system set forth in claim 1, wherein certain digital codes are uniquely attributed to either a driver or a vehicle in a form of a personal data key configured to interface with said onboard vehicle data system and/or with said wireless network in order to transfer operator, driver or vehicle data for a specific vehicle use case such that a vehicle is secured to accept data keys of multiple drivers or guest drivers, and driver preferences are adapted to associate with multiple vehicles, including rental vehicles.

9. The vehicle communication, analysis and operation system set forth in claim 1, wherein certain digital codes are uniquely attributed to either a driver or a vehicle in a form of a personal data key configured to interface with said onboard vehicle data system and/or with said wireless network in order to transfer operator, driver or vehicle data for a specific vehicle use case such that said personal data key is a programmable data key that records certain driving habits thereby becoming a storage medium for driver personality data.

10. The vehicle communication, analysis and operation system set forth in claim 1, wherein said vehicle profile has simulated characteristics in its performance, or data reporting capabilities, or in its social networking whereby a vehicle has its own cyber identity such that other vehicles or operators are associated with said vehicle profile given a rule based environment.

11. The vehicle communication, analysis and operation system set forth in claim 1, wherein driver or vehicle preferences act as data inputs to said rule based system allowing optimization of real-time processing and where predictive aspects of what is happening on a vehicle data system are displayed or shared on said wireless network without a real-time update.

12. The vehicle communication, analysis and operation system set forth in claim 11, wherein said rule based system incorporates use patterns of a specific vehicle, or a specific user, and wherein said use patterns are transferable from one vehicle operator to another vehicle operator or sharable with multiple vehicle operators to assist with navigation and operations of multiple vehicles.

13. The vehicle communication, analysis and operation system set forth in claim 11, wherein prioritization of actions are broken down into use case processing that is dependent upon user associated rules or reporting requirements.

14. The vehicle communication, analysis and operation system set forth in claim 1, wherein vehicle performance sensors are multiple accelerometers that derive variations in conditions including vehicle vibrations and/or acceleration in multiple axes such that data from said multiple accelerometers can be integrated to determine velocity or displacement or patterns to characterize vehicle performance.

15. The vehicle communication, analysis and operation system set forth in claim 1, wherein vehicle performance sensors are multiple accelerometers that derive variations in conditions including vehicle vibrations and/or acceleration in multiple axes such that driver actions are monitored to allow for vehicle actions to be used as response mechanisms in a vehicle centric analysis system.

16. The vehicle communication, analysis and operation system set forth in claim 1, wherein data from the data processing of said at least one vehicle sensor is packaged as a solution to multiple algorithms including piecewise functions which can include polynomial representations of data intervals.

17. A vehicle communication, analysis and operation system for managing vehicles and optimizing vehicle performance, comprising:
  a) a wireless network;
  b) at least one database server in communication with said wireless network, said database server comprising a multi tiered database; and
  c) at least one vehicle capable of communicating with said wireless network, said at least one vehicle including an on-board vehicle data system having an at least one memory unit, a central processing unit in communication with said at least one memory unit, a transceiver for communicating with said wireless network, a digital display, and at least one vehicle performance sensor;
  d) wherein said on-board vehicle memory unit is configured to store a first data processing module having instructions to configure the central processing unit to collect, store and analyze data from said at least one vehicle performance sensor;
  e) wherein said on-board vehicle memory unit is configured to store a rule based analysis system and a second data processing module having instructions to configure the central processing unit to employ inputs from said at least one vehicle performance sensor and correlation with analysis techniques such that said rule based analysis system manages data operations of said vehicle and when said vehicle is in communication with said wireless network, said vehicle can also manage said data operations of said vehicle based on real-time, historical and predictive knowledge, without all data processing occurring on-board said vehicle;
  f) wherein driver or vehicle preferences act as data inputs to said rule based system allowing optimization of real-time processing and where predictive aspects of what is happening on a vehicle data system are displayed or shared on said wireless network without a real-time update;
g) wherein prioritization of actions are broken down into use case processing that is dependent upon user associated rules or reporting requirements; and
h) wherein said reporting requirements are based on results of spatial rules, and performed as specified for a spatial rule, or are based on non-spatial activities and actions that impact a weighting of said spatial rules such that
  i) analysis of data including integration, derivative or exclusion of certain events can be compared in a timeline using a variety of methods and types of algorithms and a predictive analysis can be made by comparing prior events; and
  ii) a distributed network architecture allows said vehicle data system to function whether or not in communication with said wireless network.

18. A vehicle communication, analysis and operation system for communicating at least one travel plan for optimized vehicle performance, comprising:
a) an on-board vehicle data system having at least one memory unit, a central processing unit in communication with the at least one memory unit, a transceiver for communicating with a wireless network, and a digital display;
b) said on-board vehicle data system configured to communicate with a geographic positioning system, said vehicle data system having at least one vehicle performance sensor;
c) said on-board vehicle data system memory configured to store a first data processing module having instructions to configure the central processing unit to produce dynamic mapping of a travel plan;
d) said on-board vehicle data system memory configured to store a second data processing module having instructions to configure the central processing unit to collect, store and correlate vehicle operational data derived from said at least one vehicle performance sensor with vehicle, driver or geospatial use pattern data and, using intelligent correlation with analysis techniques involving a rule based system, produce at least one travel plan that optimizes vehicle performance;
e) said vehicle performance being optimized with respect to at least one of vehicle battery life, vehicle real-time battery demand, regenerative braking status, speed, or travel time depending on a user, vehicle or operational profile;
f) said user, vehicle or operational profile being created and stored in a user database which can be located on any storage medium capable of communicating with said on-board vehicle data system memory; and wherein said user, vehicle or operational profile manages preferences of said user or sets automated prioritization of said driver or vehicle set preferences based on prior use of said vehicle to optimize use of multiple vehicles in a similar pattern such that
  i) data processing of said at least one vehicle sensor data can result in creation of a profile which can be presented as an algorithm interpolation and a comparison of variables can be efficiently made without all of said vehicle sensor data; and
  ii) data processing of said at least one vehicle sensor data can result in only change related data in a form of an algorithm variable needing to be transmitted either to or from a vehicle.

19. The vehicle communication, analysis and operation system set forth in claim 18, further comprising an off-board data processing server in communication with said wireless network; said off-board data processing server having at least one pattern analysis module that derives and packages use pattern data for communication to said on-board vehicle data system; said use pattern data including:
a) specific use pattern data from data collected from said vehicle's and said driver's historical and real-time vehicle use;
b) geospatial use pattern data from historical, real-time and predictive geospatial data; and
c) efficiency use pattern data from data collected from multiple vehicle's and driver's historical use data.

20. The vehicle communication, analysis and operation system set forth in claim 19, said second data processing module further having instructions to configure the central processing unit to correlate said vehicle operational data with user travel plan preference data using intelligent correlation with analysis techniques involving a rule based system to produce at least one travel plan for optimum vehicle performance.

* * * * *